Oct. 18, 1938.                    C. GIRL                    2,133,443
KNEE REST FOR AUTOMOBILES
Filed Oct. 16, 1936
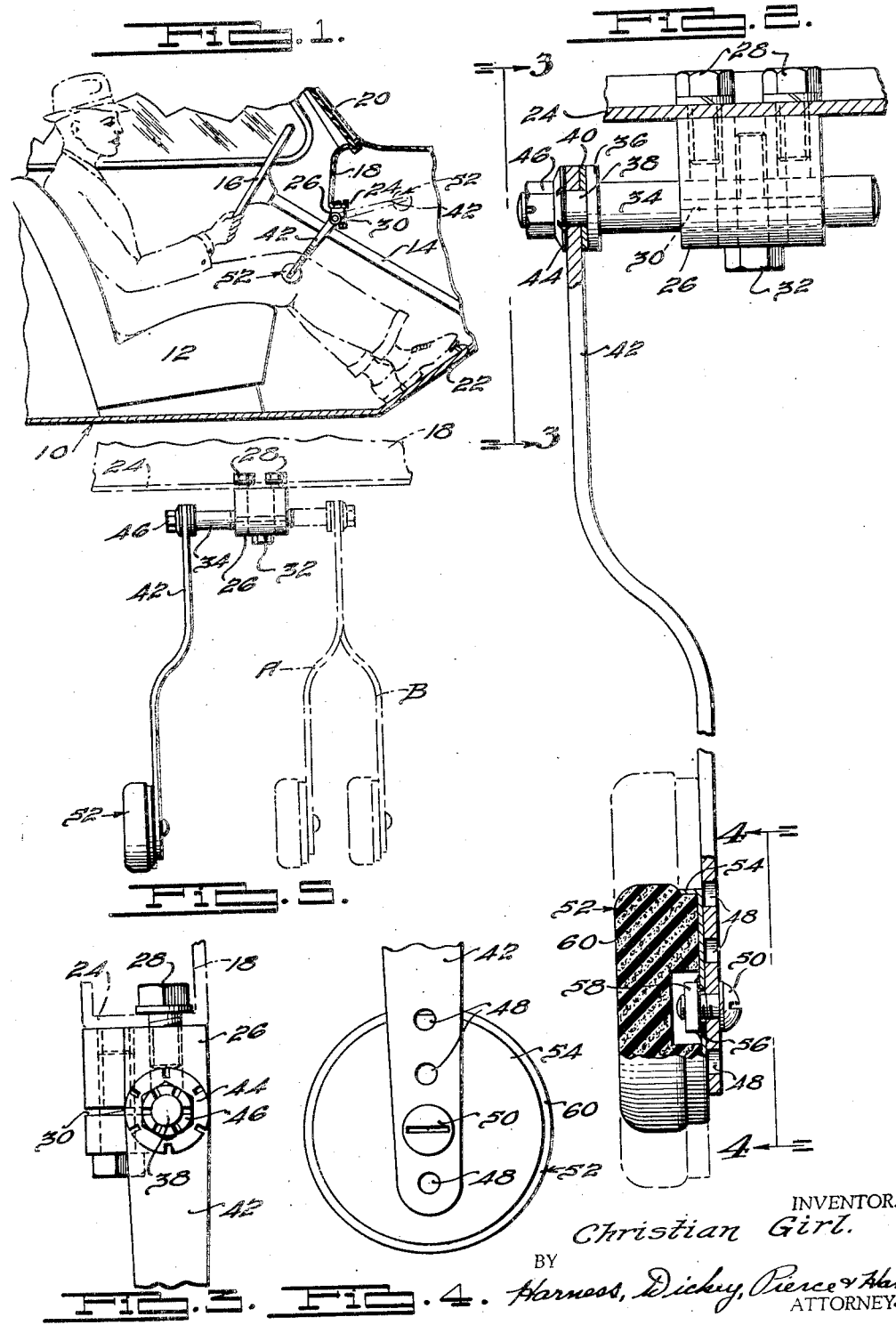
INVENTOR.
Christian Girl.
BY
Harness, Dickey, Pierce & Hann
ATTORNEYS.

Patented Oct. 18, 1938

2,133,443

UNITED STATES PATENT OFFICE 2,133,443

KNEE REST FOR AUTOMOBILES

Christian Girl, Detroit, Mich., assignor to Kelch Heater Company, Detroit, Mich., a corporation of Michigan Application October 16, 1936, Serial No. 105,848

9 Claims. (Cl. 155—165)

This invention relates to knee or leg rests for automobiles, the principal object being the provision of a simple and economical device of this type that is readily adjustable to suit the individual user and automobile.

Objects of the invention include the provision of a knee or leg rest for the driver of an automobile including a suitably supported yieldable arm carrying a contact pad for engagement with the leg of the driver at or adjacent his knee; the provision of a knee or leg rest, for the driver of an automobile, supported from the instrument panel thereof and capable of being swung to an inoperative position behind the instrument panel; the provision of a knee or leg rest for the driver of an automobile so constructed and arranged as to permit the contact pad thereof to be adjusted over a relatively great distance laterally of the automobile, as well as toward and from the driver; the provision of a device of the type described including a shaft adjustably mounted upon the instrument panel of the automobile for movement in a direction transverse to the automobile and carrying a contact pad supporting arm which itself is so constructed and arranged as to permit the range of adjustment of the shaft to be augmented, by reversal of the arm thereon, to effect a greater degree of lateral adjustment of the contact pad than would otherwise be provided solely by the shaft; and the provision of a device of the type described including a co-operating reversible shaft and arm for supporting a contact pad in position to engage the leg of an automobile driver adjacent the knee thereof, the relation of the shaft arm and pad being such that reversal of one or more of them with respect to another thereof provides a wide range of adjustment for adapting the pad to the knee or leg of an individual driver.

The above being among the objects of the present invention, the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Figure 1 is a fragmentary, vertical sectional view taken approximately on the longitudinal center line of an automobile at and adjacent that portion thereof including the driver's seat and illustrating the application of the present invention thereto;

Fig. 2 is an enlarged, partially broken, partially sectioned front elevational view of the knee rest, showing the same attached to a portion of the instrument panel of the automobile, and illustrating in dotted lines the range of adjustment of the pad longitudinally of the supporting arm;

Fig. 3 is a fragmentary, side elevational view of the upper end of the device as viewed in Fig. 2 and taken as looking in the direction of the arrows 3—3 of Fig. 2;

Fig. 4 is a fragmentary, side elevational view of the lower end of the supporting arms shown in Fig. 2 together with the pad thereon as viewed in the direction of the arrows 4—4 of Fig. 2;

Fig. 5 is a reduced, more or less diagrammatic front elevational view of the device illustrating the variations in transverse adjustments of the pad which may be obtained simply by reversing the supporting arm on the shaft, or the shaft in its bracket.

It has been found exceedingly restful for an automobile driver, particularly on a long drive, if some means are provided to limit outward movement of his knee of that leg through which he operates the accelerator pedal, and this is particularly true in connection with those automobiles in which the gear shift lever and emergency brake lever have been removed from the usual position in the floor and thus eliminated the possibility of utilizing these levers as a leg rest. Various devices have heretofore been suggested but as far as I am aware those heretofore suggested have included some disadvantage making them of little value commercially. It has been found that on short drives, and particularly in driving through city traffic, such knee rests are not necessary and may in fact be in the way at times under such circumstances, and for this reason a device of this type should be so constructed as to permit it to be readily placed in an out-of-way position. This device should also be relatively resilient so that when the automobile of which it forms a part hits some obstruction in the road the shock of striking the obstruction will not be transmitted violently to that knee of the driver engaging the support. While such shock may be materially lessened by employing a resilient pad for contact with the leg of the driver I have found that it is necessary to make the pad of undue size if it alone is relied upon to cushion such shock and that if the pad is supported upon a readily yieldable arm it may be made of relatively small dimensions and so relieve the driver of the shocks mentioned.

Such a knee rest should also be capable of adjustment laterally of the automobile in order to adapt it to the particular individual driving the same and it is, of course, desirable from both the standpoint of economy in manufacture and appearance sake that the device be made as small and unobtrusive as possible. The present invention provides a device of the type described overcoming the disadvantages of previously described constructions as above pointed out.

Referring to the accompanying drawing, and particularly to Fig. 1, an automobile body is indicated generally at 10 and as being provided with a conventional seat 12, steering post 14, steering wheel 16, instrument panel 18, windshield 20 and accelerator pedal 22. Where the steering wheel 16 is positioned on the lefthand side of the automobile as illustrated and as is conventional practice in the United States of America, it is the right foot of the driver which is employed to operate the accelerator pedal 22, and this is the condition which will be assumed in connection with the following description, it being understood that where the invention is applied to automobiles having the steering wheel on the righthand side thereof, the arrangement of the present invention will be varied to suit such arrangement.

As in the case of substantially all present day instrument panels, the instrument panel 18 is provided along its lower edge with an inwardly and forwardly turned flange 24 and in accordance with the present invention this flange is employed for the support of the knee rest. Accordingly, a bracket 26 is bolted to the under face of the flange 24 by means of a pair of cap screws 28 as best illustrated in Figs. 2 and 3 these cap screws extending downwardly through the flange 24 and being threaded into the bracket 26 so as to securely clamp it to the under face of the flange 24.

The bracket 26 is provided with a cylindrical bore therethrough arranged horizontally and extending in a direction transverse to the length of the automobile. One side of the bracket 26 is slotted as at 30 into the bore of the bracket 26 and a cap screw such as 32 extends upwardly through the slotted side of the bracket 26 so as to enable it, when tightened up, to contract the diameter of the bore in the bracket.

Received within the bore of the bracket 26 is a shaft 34, of materially greater length than the width of the bracket and provided at one end thereof with a peripheral flange 36 outwardly beyond which the shaft 34 is formed to provide a pin 38 threaded on its outer end to provide a stud. It will be understood, of course, that the shaft 34 is axially movable within the bore of the bracket 26 when the nut 32 is released so as to permit axial adjustment thereof relative the bracket 26, it being locked in such position when the nut 32 is re-tightened.

Surrounding the pin 38 on the end of the shaft 34 and abutting the peripheral flange 36 is a friction washer 40, preferably formed from fiber or other suitable material. One end of an arm 42 is apertured to receive the pin 38 and is received thereupon in contact with the washer 40. A spring washer 44 is received upon the pin 38 outwardly of the end of the arm 42 and is followed by a nut 46 which is tightened up upon the outer threaded end of the pin 38 so as to cause the upper end of the arm 42, as viewed in Fig. 2, to be pressed axially of the pin 38 against the washer 40, and the washer 40 axially of the pin 38 against the side face of the flange 36 of the shaft 34. Preferably the nut 46 is not tightened sufficiently to prevent the arm 42 from being manually grasped and rotated about the axis of the shaft 34 against the friction set up between the arm 42, washer 40 and flange 36, but is tightened sufficiently to prevent the arm 42 from inadvertently moving out of its so adjusted position.

The opposite end of the arm 42 is provided with a series of apertures or holes 48 therethrough and through one of these apertures a screw 50 projects for securing a contact pad, indicated generally at 52, thereto. Although the contact pad, in the broader aspects of the invention, may be made of any suitable material, such as wood, metal, moldable material or the like, and any desired shape, the preferable construction as illustrated in Fig. 2 comprises a more or less cup-shaped circular sheet metal base portion 54 centrally provided with an aperture 56 for the passage of the screw 50 and a nut member 58 concentric therewith and welded, brazed or otherwise permanently fixed with respect to the interior of the cup member 54. A sponge or other rubber pad 60 has one side thereof received and secured within the cup member 54 in any suitable manner and thus provides the actual pad or contact member for contact with the leg of the driver. The screw 50 projects through one of the openings 48 in the arm 42, through the aperture 56 in the cup member 54 and is threaded into the nut member 58 and thus serves to secure the pad 52 to the arm 42.

The arm 42 is preferably formed from strip material and preferably of spring or spring-like material so that it may yield under the lateral pressure of the driver's knee. It will be noted that one end thereof is offset from the plane of the other end thereof. The purpose of offsetting one end of the arm 42 from the other end thereof is to increase the range of adjustment of the pad 52 transversely of the automobile over that which would otherwise be provided solely by axial adjustment of the shaft 34 in the bracket 26, as will hereinafter be more specifically pointed out.

In adapting devices of this type to an automobile it will be understood that due to variations in the construction of different automobiles it is not always possible to place the bracket 26 at a definite point on the instrument panel and consequently the device must be designed to permit a reasonable amount of leeway in the positioning of the bracket 26. Additionally, one driver may sit in a slightly different position transversely of the seat as compared to another driver and the physical characteristics of the drivers themselves necessitates a variation in the position of the pad 52 transversely of the automobile in order to position the pad 52 most comfortably with respect to the knee of the driver, it being understood that the pad 52 is adapted for contact with the side of the knee of the driver on that leg thereof to which the accelerator pedal 22 is operated, or for contact with the leg adjacent to such knee. Accordingly, a relatively large tolerance in the positioning of the bracket 26 and adjustment of the pad 52 is required to make the device adaptable for different makes of automobiles and drivers of different characteristics, and although the device of the present invention is unusually small and compact it still permits the desired range of adjustments of the position of the pad 52.

It is, of course, obvious that where the device is arranged as illustrated in Fig. 2, upon loosening the nut 32 the shaft 34 and consequently the pad 52 may be adjusted transversely of the automobile relative to the bracket 26 by sliding the shaft 34 axially one way or another between the flange 36 and the opposite end of the shaft 34 within the bracket 26. If the bracket 26 is so positioned that the pad 52, when the parts are arranged as illustrated in Fig. 2, is not sufficiently far to the left as viewed in Fig. 2, then the nut 46 and spring washer 44 may be removed, the arm 42 removed and reversed on the pin 38 and the washer 44 and nut 46 replaced. The pad 52 will now be on the wrong side of the opposite end of the arm 42 but this may be corrected by removing the screw 50, reversing the pad 52 and again inserting the screw 50. The parts in such changed positioned would then assume the position shown in full lines in Fig. 5 and would permit the pad 52 to be projected to the left from the position illustrated in Fig. 2 by a distance equal to twice the distance between the planes of the opposite ends of the arm 42.

On the other hand, if the pad 52 is found to be too far to the left in the position of the parts as illustrated in Fig. 2, the screw 32 may be loosened, the shaft 34 and all parts carried thereby removed from the bracket 26, the shaft and the parts carried thereby reversed end for end and replaced in the bracket 26 and the screw 32 again tightened up to lock the shaft in position. In this case, as in the case previously described it will necessitate reversal of the pad 52 and in such case the parts will assume the position indicated by the dotted lines A in Fig. 5. If it is desired to position the pad 52 still further to the right than that indicated by the dotted lines A, then all that it is necessary to do is to reverse the arm 42 on the end of the shaft 34 from the position indicated at A in Fig. 5 in which case the pad 52 will be positioned further to the right and the parts will assume the position indicated by the dotted lines B in Fig. 5. It will, of course, be understood that in any of the positions indicated in Fig. 5 the shaft 34 is still axially adjustable in the bracket 26 to provide a smaller range of adjustment between the various adjustable positions shown, which thus permits the pad 52 to be placed in any desired position between the two extreme limits illustrated in Fig. 5. It will thus be apparent that although the device is exceedingly small and compact it permits an unusual degree of adjustment of the pad 52 transversely of the automobile.

It will also be understood that because of the variation in distances between the back of the seat 12 and the instrument panel 18 in various makes of automobiles and in automobiles of the same make and model, it is desirable to provide an adjustment of the pad 52 longitudinally of the arm 42 in order to permit the pad 52 to be positioned to engage the leg of the driver at the desired position. In order to effect this adjustment the plurality of holes 48 are provided and by removing the screw 50 and inserting it in the proper hole 48 the pad 52 may be adjusted longitudinally of the arm within the limits indicated by dotted lines in Fig. 2, this range of adjustment being ample for the purpose.

As previously described when it is desired to employ the knee rest the arm 42 or pad 52 is grasped and the pad 52 manually moved to the desired position to contact with the knee of the driver, it being considered, of course, that the pad 52 has been previously adjusted laterally of the automobile as above described, so as to properly accommodate the knee of the driver when placed in operative position. When it is not desired to employ the knee rest, the arm 42 or pad 52 is grasped and manually moved to a position forwardly of the instrument panel 18 and beneath the cowl of the automobile in which position it is substantially concealed from view and is out of the way of any possible interference with the driver.

From the above it will be understood that the present invention provides a simple compact device economical to produce and efficient in operation and capable of adapting itself to various makes of cars and to the individual characteristics of various drivers.

It will, of course, be understood that the embodiment of the invention shown is a preferred form and that it is capable of various modifications and changes once the principles of the invention are made known, and, accordingly, it will be understood that formal changes may be made in the specific embodiment of the invention shown without departing from the substance or spirit of the broad invention, the scope of which is commensurate with the appended claims.

What I claim is:

1. A knee or leg rest for use in connection with an automobile having an instrument panel provided with a flange at the lower edge thereof comprising, in combination, a bracket fixed to said flange, an arm supported through said bracket and projecting therefrom, and a pad carried by the projecting end portion of said arm for contact with the leg of the driver of the automobile, the connection between said arm and said bracket being so constructed and arranged to permit said pad to be moved to concealed relation with respect to said instrument panel when not in use.

2. In combination with the instrument panel of an automobile, a bracket fixed to said instrument panel, a shaft axially movable in a direction transverse to the width of said automobile carried by said bracket, means for locking said shaft against relative axial movement with respect to said bracket, an arm pivotally mounted upon said shaft and projecting therefrom, a friction connection between said arm and shaft, and a pad carried by the opposite end of said arm for engagement with the leg of the driver of said automobile, said bracket being so constructed and arranged with respect to said instrument panel and said shaft and arm that said shaft and arm may be moved into substantially concealed relation with respect to said instrument panel when not in use.

3. A leg rest for the driver of an automobile comprising, in combination, a bracket having a bore therein, a shaft axially movable within said bore, means for clamping said shaft against movement in said bore, an arm pivotally mounted at one end thereof on said shaft, a friction connection between said arm and shaft, a pad on the opposite end of said arm, the opposite end portions of said arm being arranged in planes spaced axially of said shaft and said arm being reversible on said shaft whereby to enable the position of said pad to be varied axially of said shaft.

4. In combination with an automobile body having an instrument panel and a flange along the lower edge thereof, a bracket fixed to said flange, an arm pivotally secured at one end relative to said bracket and a pad secured to the opposite end of said arm, said arm being movable to a position to bring said pad rearwardly of said instrument panel to a position to engage the leg of the driver and being alternately movable to a position to bring said pad forwardly of said instrument panel whereby to place it in an inoperative position and substantially conceal it from the view of the driver.

5. For use in connection with an automobile having an instrument panel, in combination, a bracket adapted to be secured to said panel and provided with a bore therethrough in a direction transversely of the length of said automobile, a shaft received within said bore, means for clamping said shaft in said bore, an arm having one end thereof secured upon one end of said shaft, and a pad carried at the opposite end of said arm for engagement with the right knee of the automobile driver, means for securing said pad to either side of said opposite end of said arm and said shaft being insertable into either end of said bore whereby to enable the position of said pad to be varied transversely of said automobile for accommodation of drivers of varying physical characteristics.

6. In a leg rest for automobiles, in combination, a bracket having a bore therethrough, a shaft received within said bore, means for clamping said shaft in said bore, an arm mounted at one end thereof on one end of said shaft, a pad carried by the opposite end of said arm, the planes of the opposite ends of said arm being offset from each other axially of said shaft and said arm being reversible on said shaft whereby to permit the position of said pad to be varied with respect to the end of said shaft axially thereof.

7. In a leg rest for automobiles, in combination, a bracket having a bore therethrough, a shaft received within said bore, means for clamping said shaft in said bore, an arm mounted at one end thereof on one end of said shaft, a pad carried by the opposite end of said arm, the planes of the opposite ends of said arm being offset from each other axially of said shaft, and said arm being reversible on said shaft whereby to permit the position of said pad to be varied with respect to the end of said shaft axially thereof, and said shaft being reversible in said bracket whereby to provide further adjustment of said pad axially of the bore in said bracket.

8. In combination, a bracket having a bore therein, a shaft axially movable in said bore, means for locking said shaft in axially adjusted position in said bore, an arm pivotally mounted at one end thereof on one end of said shaft, a friction connection between said arm and shaft, the opposite end of said arm being provided with a plurality of apertures therethrough, a screw insertable through any one of said apertures, a pad secured to said opposite end of said arm by said screw, said arm being formed of resilient material whereby to permit yielding of said pad under lateral pressure acting thereon.

9. In combination, a bracket having a bore therethrough, a shaft axially adjustable in said bore, means for clamping said shaft in axially adjusted position in said bore, an arm, one end of said arm being pivotally mounted upon an end of said shaft, the opposite end of said arm being provided with a plurality of apertures therein, a screw insertable through one of said apertures, a pad secured to said opposite end of said arm by said screw, the planes of the opposite ends of said arm being offset from each other axially of said shaft, said shaft being reversible in said bore whereby to augment the adjustability of said pad with respect to said bracket axially of said bore, and said arm being reversible on said shaft whereby to further augment the adjustable position of said pad with respect to said bracket axially of said bore.

CHRISTIAN GIRL.